United States Patent
Xhakoni

(10) Patent No.: US 12,123,771 B2
(45) Date of Patent: Oct. 22, 2024

(54) PIXEL CELL, IMAGE SENSOR AND METHOD FOR OPERATING A PIXEL CELL WITH TWO READOUT COMPONENTS

(71) Applicant: ams Sensors Belgium BVBA, Antwerp (BE)

(72) Inventor: Adi Xhakoni, Kessel Lo (BE)

(73) Assignee: AMS SENSORS BELGIUM BVBA, Antwerp (BE)

( * ) Notice: Subject to any disclaimer, the term of this patent is extended or adjusted under 35 U.S.C. 154(b) by 190 days.

(21) Appl. No.: 17/792,285

(22) PCT Filed: Dec. 8, 2020

(86) PCT No.: PCT/EP2020/085099
§ 371 (c)(1),
(2) Date: Jul. 12, 2022

(87) PCT Pub. No.: WO2021/144074
PCT Pub. Date: Jul. 22, 2021

(65) Prior Publication Data
US 2023/0054015 A1    Feb. 23, 2023

(30) Foreign Application Priority Data

Jan. 13, 2020  (EP) .................................. 20151456

(51) Int. Cl.
*G01J 1/44*     (2006.01)
*H04N 23/11*    (2023.01)
(Continued)

(52) U.S. Cl.
CPC ............... *G01J 1/44* (2013.01); *H04N 23/11* (2023.01); *H04N 25/40* (2023.01);
(Continued)

(58) Field of Classification Search
CPC ...... G01J 1/44; G01J 2001/446; H04N 23/11; H04N 25/40; H04N 25/771; H04N 25/772; H04N 25/79
See application file for complete search history.

(56) References Cited

U.S. PATENT DOCUMENTS

| 2010/0012841 A1 | 1/2010 | Rafferty et al. |
| 2011/0260059 A1 | 10/2011 | Jiang et al. |

(Continued)

FOREIGN PATENT DOCUMENTS

| CN | 206908723 U | 1/2018 |
| EP | 3503535 A1 | 6/2019 |

OTHER PUBLICATIONS

International Search Report and Written Opinion mailed Mar. 4, 2021 in correspondence International Application No. PCT/EP2020/085099, 12 pages.

(Continued)

*Primary Examiner* — Gevell V Selby
(74) *Attorney, Agent, or Firm* — MH2 Technology Law Group LLP

(57) ABSTRACT

A pixel cell comprises a plurality of pixels, each pixel comprising a photodiode, a readout circuit comprising a first readout component and a second readout component, wherein a first group of the pixels is configured to detect electromagnetic radiation in a first wavelength range, a second group of the pixels is configured to detect electromagnetic radiation in a second wavelength range, the first readout component is connected with the first group of pixels, the second readout component is connected with the second group of pixels, the first wavelength range is different from the second wavelength range, and the second readout component comprises a plurality of storage capacitors, wherein each pixel of the second group of pixels is assigned to at least one of the storage capacitors, or the (Continued)

second readout component comprises a memory element. Furthermore, a method for operating a pixel cell is provided.

15 Claims, 3 Drawing Sheets

(51) Int. Cl.
 *H04N 25/40* (2023.01)
 *H04N 25/771* (2023.01)
 *H04N 25/772* (2023.01)
 *H04N 25/79* (2023.01)

(52) U.S. Cl.
 CPC ......... *H04N 25/771* (2023.01); *H04N 25/772* (2023.01); *H04N 25/79* (2023.01); *G01J 2001/446* (2013.01)

(56) References Cited

U.S. PATENT DOCUMENTS

| | | |
|---|---|---|
| 2016/0181298 A1 | 6/2016 | Wan et al. |
| 2017/0366766 A1 | 12/2017 | Geurts et al. |
| 2018/0084164 A1 | 3/2018 | Hynecek et al. |
| 2020/0035724 A1* | 1/2020 | Machida .............. H04N 25/771 |
| 2021/0164839 A1* | 6/2021 | Hong .................... H04N 23/11 |
| 2021/0373164 A1* | 12/2021 | Thun-Hohenstein ........................ G01S 7/4865 |
| 2022/0247960 A1* | 8/2022 | Ikedo .................. H04N 25/709 |

OTHER PUBLICATIONS

Takemoto et al., "Multiband Imaging CMOS Image Sensor with Multi-Storied Photodiode Structure," Sensors (2018), 18, 1688 (9 pages).

Xhakoni et al., "A Low-Noise High-Frame-Rate 1-D Decoding Readout Architecture for Stacked Image Sensors," IEEE Sensors Journal, vol. 14, No. 6, Jun. 2014, pp. 1966-1973 (8 pages).

Chinese Office Action issued in Chinese Patent Application No. 2020800938769 dated Jul. 8, 2024, with English language translation, 11 pages.

\* cited by examiner

PIXEL CELL, IMAGE SENSOR AND METHOD FOR OPERATING A PIXEL CELL WITH TWO READOUT COMPONENTS

CROSS-REFERENCE TO RELATED APPLICATIONS

The present application is the national stage entry of International Patent Application No. PCT/EP2020/085099, filed on Dec. 8, 2020, and published as WO 2021/144074 A1 on Jul. 22, 2021, which claims the benefit of priority of European Patent Application No. 20151456.9, filed on Jan. 13, 2020, all of which are incorporated by reference herein in their entireties.

FIELD OF THE INVENTION

The present invention relates to a pixel cell, an image sensor and a method for operating a pixel cell.

BACKGROUND OF THE INVENTION

Image sensors can be operated in rolling shutter mode or in global shutter mode. In rolling shutter mode the pixels of a pixel matrix are illuminated by a light source. During the illumination the pixels are sequentially exposed and read out row-by-row, such that the readout process occurs in a repeating, rolling pattern. This means, the pixel matrix is illuminated during the whole readout process. The rolling shutter mode enables a high resolution of the image sensor.

In global shutter mode all the pixels of the pixel matrix are exposed during the same time period. Therefore, a significantly shorter illumination time is required than for the rolling shutter mode. However, a readout circuit for the global shutter mode consumes more space within the image sensor than a readout circuit for the rolling shutter mode. Furthermore, the resolution of an image sensor operating in global shutter mode is lower than for an image sensor operating in rolling shutter mode.

It is an objective to provide a pixel cell with an increased accuracy. It is further an objective to provide an image sensor that can be operated efficiently and with an increased accuracy. It is further an objective to provide a method for operating a pixel cell with an increased accuracy.

These objectives are achieved by the subject matter of the independent claims. Further developments and embodiments are described in dependent claims.

SUMMARY OF THE INVENTION

According to at least one embodiment of the pixel cell, the pixel cell comprises a plurality of pixels, each pixel comprising a photodiode. The pixels can be arranged as a two-dimensional array or as a pixel matrix. The photodiodes are each configured to convert electromagnetic radiation into an electrical signal. The pixels can be arranged next to each other in lateral directions, where the lateral directions run parallel to the main plane of extension of the pixel cell. The pixel cell comprises for example at least 1 million pixels.

The pixel cell further comprises a readout circuit comprising a first readout component and a second readout component. The readout circuit can be configured to read out the electrical signals provided by the photodiodes. The readout circuit can comprise an output where the electrical signals of the photodiodes can be provided. The readout circuit can further be configured to operate the pixels. The first readout component and the second readout component can be configured to operate independently from each other.

A first group of the pixels is configured to detect electromagnetic radiation in a first wavelength range. The first group of pixels can comprise a plurality of pixels. For example, the first group of the pixels comprises at least 1 million pixels. The first wavelength range can comprise a plurality of wavelengths.

A second group of the pixels is configured to detect electromagnetic radiation in a second wavelength range. The second group of pixels can comprise a plurality of pixels. For example, the second group of the pixels comprises at least 1 million pixels. The second wavelength range can comprise a plurality of wavelengths.

The first readout component is connected with the first group of pixels. This can mean, that each pixel of the first group of pixels is connected with the first readout component. The first readout component is electrically connected with the first group of pixels. The first readout component can be configured to read out the electrical signals provided by the photodiodes of the first group of pixels.

The second readout component is connected with the second group of pixels. This can mean, that each pixel of the second group of pixels is connected with the second readout component. The second readout component is electrically connected with the second group of pixels. The second readout component can be configured to read out the electrical signals provided by the photodiodes of the second group of pixels.

The first wavelength range is different from the second wavelength range. This can mean, that the first wavelength range comprises a range of wavelengths that are different from the wavelengths comprised by the second wavelength range.

The second readout component comprises a plurality of storage capacitors, wherein each pixel of the second group of pixels is assigned to at least one of the storage capacitors, or the second readout component comprises a memory element. It is also possible that the second readout component comprises a plurality of storage capacitors, wherein each pixel of the second group of pixels is assigned to at least one of the storage capacitors, respectively, or the second readout component comprises a memory element. This means, the second readout component either comprises the plurality of storage capacitors or a memory element. Each of the pixels of the second group of pixels can be assigned to exactly one of the storage capacitors, respectively. This means, each of the storage capacitors is connected with only one of the pixels of the second group of pixels. It is further possible that each pixel of the second group of pixels is assigned to two storage capacitors, respectively. Alternatively, at least two of the pixels of the second group of pixels can be assigned to the same storage capacitor. The memory element is, for example, a static random access memory or a dynamic random access memory.

Each of the storage capacitors can be comprised by a sample and hold stage. This means, each storage capacitor can be connected with a switch. Each sample and hold stage can be configured to receive electrical signals from one or more than one of the photodiodes of the second group of the pixels and to save the corresponding electrical charges on the storage capacitor for a predefined time interval. In this way, the analog signal detected by the photodiode of the second group of the pixels is converted into a digital signal. The storage capacitors can be configured to receive the electrical signals from the photodiodes sequentially or in groups. This means, the electrical signals of the photodiodes of the second group of the pixels are sequentially transferred to the respective storage capacitors, for example during illumination with a light source. It is further possible that the storage capacitors are configured to receive electrical signals from a group of photodiodes simultaneously. The group of photodiodes is for example arranged within one row of the pixels. Each row of photodiodes can form a separate group of photodiodes.

The storage capacitors are further configured to be read out by the second readout component after each other or sequentially. The storage capacitors are configured to be read out after the exposure of the photodiodes to the light source. For example, the charge stored on a storage capacitor can be transferred to a column bus of the second readout component. In this way, the storage capacitor is read out. Reading the information stored on a storage capacitor means transferring the electrical charge stored on the storage capacitor to another unit of the second readout component, for example to a column bus. The charge stored on the storage capacitors is not transferred simultaneously to another unit of the second readout component but sequentially. In this way, the electrical signals obtained by each photodiode of the second group of the pixels are read out separately from each other. This way of reading out the information of the storage capacitors enables a high resolution of the pixel cell or an image sensor comprising pixel cells.

The storage capacitors can be connected in parallel with each other. Between each two neighboring storage capacitors a switch can be arranged.

If the second readout component comprises a memory element, each of the photodiodes of the second group of the pixels is connected with the memory element. Each of the photodiodes of the second group of pixels can be connected with the memory element via an analog-to-digital converter. This means, the electrical signals provided by the photodiodes are converted into digital signals before they are transferred to the memory element. The memory element can be configured to receive the electrical signals provided by the photodiodes of the second group of the pixels sequentially or in groups. This means, the electrical signals of the photodiodes are sequentially transferred to the memory element. The electrical signals of the photodiodes can be transferred to the memory element during illumination with a light source. It is further possible that the electrical signals from a group of photodiodes are transferred simultaneously to the memory element. The group of photodiodes is for example arranged within one row of the pixels. Each row of photodiodes can form a separate group of photodiodes.

The memory element is configured to be read out sequentially. This means, the electrical signals provided by the photodiodes of the second group of the pixels are stored in the memory element. The stored information about the electrical signals of the photodiodes is read out sequentially. This means, the electrical signals provided by the photodiodes of the second group of the pixels are read out after one another from the memory element. Read out in this context means that the electrical signals are further transferred from the memory element. The electrical signals provided by the photodiodes of the second group of the pixels are read out from the memory element after the exposure of the photodiodes to the light source. Reading out the information from the memory element can comprise transferring electrical signals received by the photodiodes of the second group of the pixels to another unit of the second readout component, for example to a column bus. In this way, the electrical signals obtained by each photodiode of the second group of the pixels are read out separately from each other. This way of reading out the information of the memory element enables a high resolution of the pixel cell or an image sensor comprising pixel cells.

The two alternatives provided for the setup of the second readout component differ in the storage of the electrical signals provided by the photodiodes of the second group of the pixels. According to the first alternative the electrical signals of the photodiodes of the second group of the pixels are stored in the storage capacitors. According to the second alternative the electrical signals of the photodiodes of the second group of the pixels are stored in the memory element. For both alternatives the electrical signals are obtained by the photodiodes of the second group of the pixels and the stored information is read out sequentially and not simultaneously. The transfer of electrical signals from the photodiodes to the second readout component is significantly faster than the sequential transfer of the stored information, since the electrical signals are temporarily saved by the storage capacitors or the memory element. A further transfer of the electrical signals from the storage capacitors or the memory element can take place during or after the illumination. Thus, the illumination time can be kept short. Despite the fast transfer of the electrical signals to the second readout component during illumination, a high resolution can be achieved because of the sequential transfer of the stored information from the second readout component.

For the pixel cell described herein two different ways of reading out electrical signals from photodiodes can be combined. The photodiodes of the first group of pixels can be read out independently from the photodiodes of the second group of pixels. The first group of the pixels and the second group of the pixels are configured to detect electromagnetic radiation in different wavelength ranges. The pixel cell described herein enables different ways of detection for these different wavelength ranges. For example for the detection of visible and infrared light different safety precautions have to be considered. If the pixel cell is comprised by an electronic device operated by users the illumination with infrared radiation should be kept short enough for not damaging the eyes of the user. Furthermore, the intensity of the electromagnetic radiation should not be too high. Short illumination times are additionally desired in order to reduce the power consumption of the light source.

The pixel cell described herein has further the advantage that the illumination time for the second group of pixels can be short. A short illumination time has the advantage that the power consumption of the employed light source is reduced. Since the information stored on the storage capacitors or in the memory element are read out sequentially, the information obtained by each pixel is transferred separately. This way of reading out enables a higher resolution and thus an increased accuracy of the pixel cell. At the same time less space is required for the second readout component than for a readout component operating in a global shutter mode. Therefore, the setup of the pixel cell can be compact. In this way, for the second readout component the advantages of the global shutter mode and the rolling shutter mode are combined.

The first readout component can be configured to operate the pixels of the first group of pixels either in a rolling shutter mode or a global shutter mode. Advantageously, the first readout component can be optimized for the first wavelength range independently from the second readout component.

According to at least one embodiment of the pixel cell, each of the storage capacitors is connected with an input of an analog-to-digital converter. For example, groups of storage capacitors are assigned to one analog-to-digital converter, respectively. This means, the second readout component can comprise a plurality of analog-to-digital converters. Each of the analog-to-digital converters can be connected with a group of storage capacitors. The analog-to-digital converters are configured to convert analog electrical signals received at their inputs into digital signals. The analog-to-digital converters can be configured to convert analog electrical signals received from the pixels of the second group of pixels into digital signals after the illumination of the pixel cell. The digital signals can be further transferred and evaluated more easily than analog signals.

According to at least one embodiment of the pixel cell, the second readout component comprises an analog-to-digital converter, wherein an input of the analog-to-digital converter is configured to be connected with at least one pixel of the second group of the pixels and an output of the analog-to-digital converter is configured to be connected with the memory element. The input of the analog-to-digital converter can be configured to be connected with different pixels of the second group of the pixels after one another. The analog-to-digital converter can be configured to convert analog electrical signals received by the pixels from the second group of pixels into digital signals. This means, the electrical signals detected by the pixels of the second group of the pixels are converted into digital signals by the analog-to-digital converter. Subsequently, the digital signals are transferred to the memory element. The conversion of the electrical signals by the analog-to-digital converter and the transfer to the memory element take place during the illumination of the pixel cell. This way of transferring the electrical signals of the pixels of the second group of pixels to the second readout component enables a fast transfer of the signals to the memory element. The electrical signals can be transferred in groups. For example, for each of the pixels of the second group of pixels the electrical signals are transferred simultaneously to the second readout component. This means, the pixel cell is operated in a rolling shutter mode. However, because of the fast transfer of the electrical signals the illumination time can be kept short.

According to at least one embodiment of the pixel cell, the storage capacitors are arranged as groups where each group comprises at least two storage capacitors that are connected with each other. For example, each group of storage capacitors comprises four storage capacitors. The storage capacitors of one group can be connected with each other in parallel. The charge collected or stored by the storage capacitors of one group can be transferred together. This means, for each group the charge collected by the storage capacitors of the respective group can be transferred together. Furthermore, for each group the charge stored on the storage capacitors of the respective group can be transferred at the same time. By arranging the storage capacitors in groups the signal-to-noise ratio of the pixel cell can be improved.

According to at least one embodiment of the pixel cell, the first readout component and/or the second readout component are configured to be operated in a rolling shutter mode. In the rolling shutter mode the photodiodes are exposed and the electrical signals obtained by photodiodes are read out sequentially. This means, the first readout component can be configured to read out the electrical signals obtained by the photodiodes of the first group of pixels sequentially. In addition or alternatively the second readout component can be configured to read out the electrical signals obtained by the photodiodes of the second group of pixels sequentially. The rolling shutter mode has the advantage that a high resolution of the pixel cell can be obtained. Therefore, also the accuracy of the pixel cell is increased.

According to at least one embodiment of the pixel cell, the first group of the pixels is configured to detect electromagnetic radiation in the visible range. This means, the photodiodes of the pixels of the first group of the pixels are configured to detect electromagnetic radiation in the visible range. The visible range can be between 400 nm and 750 nm. The detection of visible light is advantageous for a wide range of applications.

According to at least one embodiment of the pixel cell, the first group of the pixels comprises three different types of pixels, where each type of pixel is configured to detect electromagnetic radiation in a range that is different from the range of electromagnetic radiation that the other types of pixels are configured to detect. For example, a first type of the three types of pixels is configured to detect red light, for example in a range between 550 nm and 750 nm. For example a second type of the three types of pixels is configured to detect green light, for example in a range between 470 nm and 550 nm. For example a third type of the three types of pixels is configured to detect blue light, for example in a range between 400 nm and 470 nm. In this way, different colors can be detected.

According to at least one embodiment of the pixel cell, the second group of the pixels is configured to detect electromagnetic radiation in the infrared range. This means, the photodiodes of the pixels of the second group of the pixels are configured to detect electromagnetic radiation in the infrared range. The infrared range can be between 750 nm and several micrometers. The detection of infrared light is advantageous for a wide range of applications.

According to at least one embodiment of the pixel cell, the second group of the pixels comprises at least two different types of pixels, where each type of pixel is configured to detect electromagnetic radiation in a range that is different from the range of electromagnetic radiation that the other type of pixels is configured to detect. The second readout component can comprise at least two column buses where the first type of pixels is connected with a first one of the column buses and the second type of pixels is connected with a second one of the column buses. The column buses of the second readout component can be connected parallel to each other. In this way, electromagnetic radiation of different wavelengths can be detected.

According to at least one embodiment of the pixel cell, the readout circuit is arranged at a side of the plurality of pixels that faces away from a radiation entrance side of the pixel cell. This can mean that the readout circuit is arranged below the plurality of pixels. The readout circuit and the plurality of pixels are stacked on top of each other. Electromagnetic radiation can reach the pixels from the radiation entrance side. By arranging the readout circuit and the plurality of pixels on top of each other, the setup of the pixel cell can be designed to be very compact. No space next to the pixels is required for the readout circuit since it is arranged below the pixels.

According to at least one embodiment of the pixel cell, the first readout component comprises at least two portions that are arranged spaced apart from each other. This means the two portions of the first readout component are not in direct contact with each other. The two portions of the first readout component can have the same setup. The two portions of the first readout component can both be arranged below the plurality of pixels. By employing at least two portions of the first readout component the setup of the readout circuit can be compact.

According to at least one embodiment of the pixel cell, the second readout component is arranged between the two portions of the first readout component in a lateral direction that extends parallel to a main plane of extension of the pixel cell. The second readout component can be arranged next to the two portions of the first readout component. The two portions of the first readout component and the second readout component can be arranged within a plane that extends parallel to the main plane of extension of the pixel cell. The second readout component can be arranged in the center of the pixel cell. This arrangement of the two portions of the first readout component and the second readout component enables a compact setup of the pixel cell.

Furthermore, an image sensor is provided. The image sensor comprises a plurality of pixel cells. The pixel cells can be arranged as a two-dimensional array or as a matrix.

According to at least one embodiment of the image sensor, the image sensor further comprises a light source that is synchronized with the pixel cells. This can mean, that the light source is configured to emit electromagnetic radiation when the pixels are operated and detect electromagnetic radiation. The image sensor can comprise a control unit which is configured to control the light source and the pixel cells simultaneously. In this way, the operation of the light source and of the pixel cells is synchronized. By synchronizing the operation of the light source with the pixel cells it is possible to minimize the duration of the illumination. Thus, the power consumption of the light source is reduced.

Furthermore, a method for operating a pixel cell is provided. The pixel cell can preferably be employed for the method for operating a pixel cell described herein. This means all features disclosed for the pixel cell and the image sensor are also disclosed for the method for operating a pixel cell and vice-versa.

According to at least one embodiment of the method for operating a pixel cell, the method comprises exposing a plurality of pixels of a pixel cell to electromagnetic radiation, wherein each pixel comprises a photodiode, wherein a first group of the pixels is configured to detect electromagnetic radiation in a first wavelength range, and wherein a second group of the pixels is configured to detect electromagnetic radiation in a second wavelength range. The electromagnetic radiation can be provided by a light source. The light source can be synchronized with the operation of the pixel cells. This means, for example, the light source is operated and emits electromagnetic radiation only during the time that the photodiodes operate and detect electromagnetic radiation.

The method further comprises converting electromagnetic radiation into electrical signals by the photodiodes. Each of the photodiodes converts the electromagnetic radiation into electrical signals during operation. The photodiodes each convert the electromagnetic radiation emitted by the light source and reaching the respective photodiode into electrical signals.

The method further comprises transferring the electrical signals of the pixels of the first group of pixels to a first readout component of a readout circuit of the pixel cell. The electrical signals of the pixels of the first group of pixels can be transferred to the first readout component simultaneously. It is further possible that the electrical signals of the pixels of the first group of pixels are transferred to the first readout component after one another. This means, the first readout component can be operated in a global shutter mode or in a rolling shutter mode.

The method further comprises transferring the electrical signals of the pixels of the second group of pixels to a second readout component of the readout circuit. The electric signals of the pixels of the second group of pixels are sequentially transferred to the second readout component. This means, the electrical signals of the pixels of the second group of pixels are transferred to the second readout component after one another or in groups. The electrical signals of the pixels of the second group of pixels are transferred to the second readout component during the exposure to electromagnetic radiation. The transferred electrical signals are saved in the second readout component.

The first wavelength range is different from the second wavelength range.

Transferring the electrical signals of the pixels of the second group of pixels to the second readout component comprises either transferring the electrical signals of each pixel of the second group of pixels to a respective storage capacitor of the second readout component, or transferring the electrical signals of each pixel of the second group of pixels to a memory element of the second readout component. It is further possible that transferring the electrical signals of the pixels of the second group of pixels to the second readout component comprises either transferring the electrical signals of each pixel of the second group of pixels to at least one respective storage capacitor of the second readout component, or transferring the electrical signals of each pixel of the second group of pixels to a memory element of the second readout component.

If the electrical signals of the pixels of the second group of pixels are transferred to storage capacitors, each pixel is assigned to at least one storage capacitor. This means, the second readout component comprises a plurality of storage capacitors. The electrical signals of the pixels of the second group of pixels can be transferred in groups to the respective storage capacitors. This means, for example for each row of the pixel cell the electrical signals of the pixels of this row are transferred simultaneously to the respective storage capacitors. The electrical signals of pixels of different rows are transferred after one another. The transfer of the electrical signals of the pixels of the second group of pixels to the storage capacitors takes place during the exposure of the pixel cell to electromagnetic radiation. This means, the pixel cell is operated in rolling shutter mode.

If the electrical signals of the pixels of the second group of pixels are transferred to the memory element, the electrical signals are transferred in groups or sequentially to the memory element. This means, for example for each row of the pixel cell the electrical signals of the pixels of this row are transferred simultaneously to the memory element. The electrical signals of pixels of different rows are transferred after one another. The transfer of the electrical signals of the pixels of the second group of pixels to the memory element takes place during the exposure of the pixel cell to electromagnetic radiation. This means, the pixel cell is operated in rolling shutter mode.

According to the method described herein the first readout component and the second readout component can be operated independently from each other. Therefore, the first readout component and the second readout component can advantageously be optimized for different operations.

The transfer to the second readout component can be faster than usual for a rolling shutter mode since the electrical signals are temporarily saved by the second readout component. A further transfer of the electrical signals from the second readout component to an output of the pixel cell takes place after the illumination. Thus, the further readout process takes place after the illumination. Therefore, only a short illumination time is required. Furthermore, a high resolution and thus an improved accuracy is achieved since the electrical signals are transferred from the second readout component to the output of the pixel cell sequentially. For the second readout component less space is required than for a readout circuit operating in global shutter mode.

According to at least one embodiment of the method the electrical signals of the pixels of the second group of pixels are transferred to the second readout component sequentially or in groups. Since the electrical signals of the pixels are transferred to the storage capacitors or the memory element, the transfer of the electrical signals can be faster than usual for a rolling shutter mode. In this way, the illumination time can be kept short and the power consumption of the employed light source is reduced.

According to at least one embodiment of the method the first readout component and the second readout component are operated independently from each other. This means, for example, electrical signals from the photodiodes are transferred to the respective readout component independently from each other. The way of operation of the first readout component can be different from the way of operation of the second readout component. Furthermore, the setup of the first readout component is different from the setup of the second readout component. A control unit can be configured to control the first readout component and the second readout component independently from each other. In this way, the pixel cell can be operated more efficiently and with an increased accuracy.

According to at least one embodiment of the method the electrical signals stored by the storage capacitors are converted into digital signals by an analog-to-digital converter. The conversion of the electrical signals into digital signals by the analog-to-digital converter can take place after the illumination or exposure to electromagnetic radiation of the pixel cell. Thus, the conversion of the electrical signals does not increase the illumination time. The second readout component can comprise several analog-to-digital converters, where groups of storage capacitors are assigned to one analog-to-digital converter, respectively.

With this way of reading out the pixels of the second group of pixels the illumination time can be kept short.

According to at least one embodiment of the method the electrical signals of each pixel of the second group of pixels are converted into digital signals by an analog-to-digital converter before being transferred to the memory element. The conversion of the electrical signals of the pixels of the second group of pixels into digital signals and the transfer to the memory element takes place during the illumination or exposure to electromagnetic radiation of the pixel cell. The illumination or exposure can be finished after the transfer of the electrical signals of the pixels of the second group of pixels to the memory element. Therefore, a fast conversion of the electrical signals into digital signals is required in order to minimize the illumination time.

According to at least one embodiment of the method the storage capacitors are arranged as groups where each group comprises at least two storage capacitors and the electrical signals of the storage capacitors of one group are transferred together, respectively. The storage capacitors of each group are connected with each other so that the electrical signals stored by the storage capacitors of one group can be transferred together to an output of the pixel cell. The electrical signals of the storage capacitors of one group can further be transferred simultaneously. It is further possible that the electrical signals of the pixels that are connected with the storage capacitors of one group are transferred simultaneously to the corresponding storage capacitors. By transferring the electrical signals of the storage capacitors of one group together the signal-to-noise ratio of the pixel cell is increased.

According to at least one embodiment of the method the electrical signals of at least two pixels of the second group of pixels are transferred simultaneously to the second readout component. In this way, the signal-to-noise ratio of the pixel cell can be improved.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1:
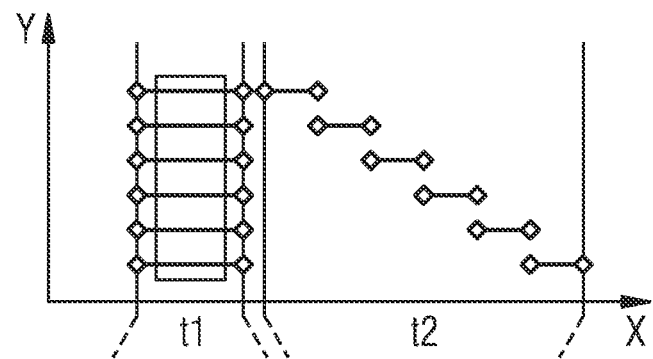
FIG. 1 shows the principle of a global shutter mode operation.

With FIG. 1 the principle of a global shutter mode operation is shown. On the x-axis the time is plotted. On the y-axis the number of rows within a pixel cell 10 is plotted. In global shutter mode all rows of pixels 11 are exposed at the same time. This time interval is denoted t1. After the illumination with electromagnetic radiation the pixels 11 are read out after one another. This time interval is denoted t2. This way, the illumination time t1 can be kept short.

Figure 2:
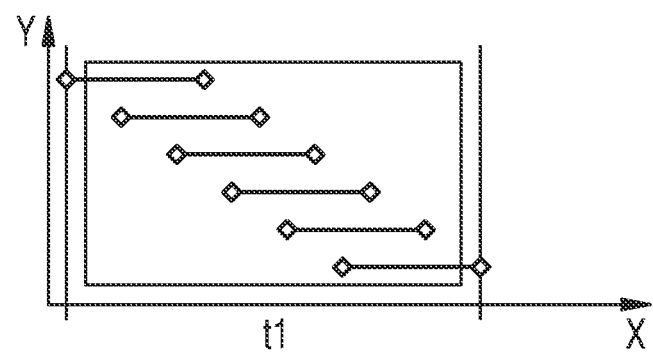
FIG. 2 shows the principle of a rolling shutter mode operation.

With FIG. 2 the principle of a rolling shutter mode operation is shown. On the x-axis the time is plotted. On the y-axis the number of rows within a pixel cell 10 is plotted. In rolling shutter mode the rows of pixels 11 are exposed and read out after one another during the illumination. The duration of the illumination with electromagnetic radiation is denoted t1. In comparison to the global shutter mode the illumination is significantly longer. This means, the power consumption of the light source 22 is increased.

Figure 3:
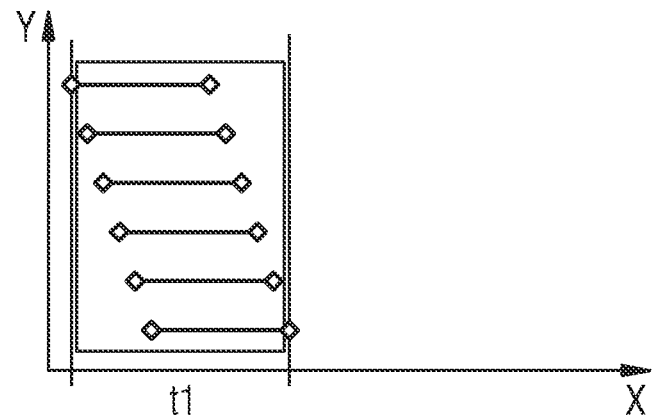
FIG. 3 shows the principle of an exemplary embodiment of the method for operating a pixel cell.

In FIG. 3 the principle of an exemplary embodiment of the method for operating a pixel cell 10 is shown. On the x-axis the time is plotted. On the y-axis the number of rows within a pixel cell 10 is plotted. As shown for the rolling shutter mode in FIG. 2 all rows of pixels 11 are exposed and read out after one another during the illumination with electromagnetic radiation. In comparison to the rolling shutter mode shown in FIG. 2, according to the method for operating a pixel cell 10 the duration t1 of the illumination is shorter. This is achieved by transferring the electrical signals of the pixels 11 to storage capacitors 16 or a memory element 17 of a second readout component 15 of the pixel cell 10 during the illumination. The transfer to the storage capacitors 16 or the memory element 17 can be faster than usual for a rolling shutter mode since the electrical signals are temporarily saved by the storage capacitors 16 or the memory element 17. A further transfer of the electrical signals from the storage capacitors 16 or the memory element 17 for example to an output 24 of the pixel cell 10 takes place after the illumination. Thus, the further readout process takes place after the illumination. In this way, a short illumination time is enabled. Thus, the method for operating a pixel cell 10 enables a short duration t1 of the illumination and a readout process that enables a high resolution.

Figure 4A:
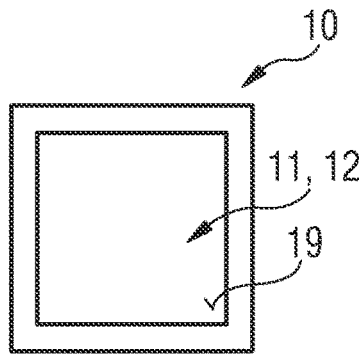
FIGS. 4A and 4B show an exemplary embodiment of the pixel cell.

In FIG. 4A a top view on an exemplary embodiment of a pixel cell 10 is shown. The pixel cell 10 comprises a plurality of pixels 11, where each pixel 11 comprises a photodiode 12. The pixels 11 are arranged next to each other in a two-dimensional array which is not shown in FIG. 4A. The pixels 11 are arranged at a radiation entrance side 19 of the pixel cell 10. A first group of the pixels 11 is configured to detect electromagnetic radiation in a first wavelength range. A second group of the pixels 11 is configured to detect electromagnetic radiation in a second wavelength range, where the first wavelength range is different from the second wavelength range. The first group of the pixels 11 is configured to detect electromagnetic radiation in the visible range. For this purpose, the first group of the pixels 11 comprises three different types of pixels 11, where each type of pixel 11 is configured to detect electromagnetic radiation in a range that is different from the range of electromagnetic radiation that the other types of pixels 11 are configured to detect. The second group of the pixels 11 is configured to detect electromagnetic radiation in the infrared range.

Figure 4B:
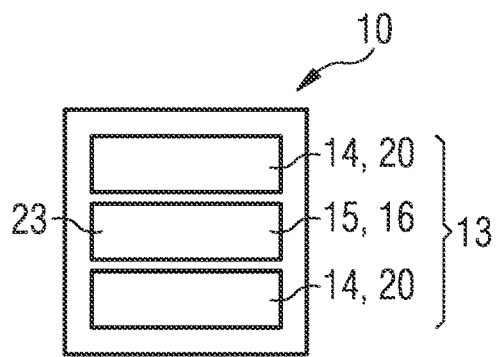

In FIG. 4B a view on a layer of the exemplary embodiment of the pixel cell 10 shown in FIG. 4A that is arranged below the plurality of pixels 11 is shown. The pixel cell 10 further comprises a readout circuit 13 comprising a first readout component 14 and a second readout component 15. The first readout component 14 is connected with the first group of pixels 11, and the second readout component 15 is connected with the second group of pixels 11. The first readout component 14 and/or the second readout component 15 are configured to be operated in a rolling shutter mode. The second readout component 15 comprises a plurality of storage capacitors 16, wherein each pixel 11 of the second group of pixels 11 is assigned to at least one of the storage capacitors 16, respectively. Each of the storage capacitors 16 is connected with an input of an analog-to-digital converter 23.

The readout circuit 13 is arranged at a side of the plurality of pixels 11 that faces away from the radiation entrance side 19 of the pixel cell 10. This means, the readout circuit 13 is arranged below the plurality of pixels 11. In FIG. 4B the plane within which the readout circuit 13 is arranged is shown.

The first readout component 14 comprises two portions 20 that are arranged spaced apart from each other. In a lateral direction x that runs parallel to a main plane of extension of the pixel cell 10 the second readout component 15 is arranged between the two portions 20 of the first readout component 14.

Figure 5A:
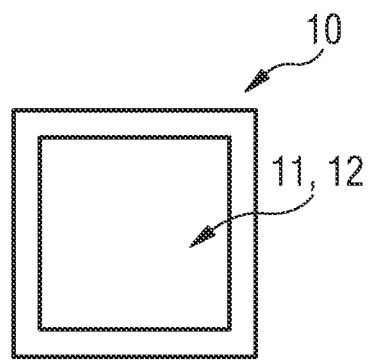
FIGS. 5A and 5B show another exemplary embodiment of the pixel cell.
Figure 5B:
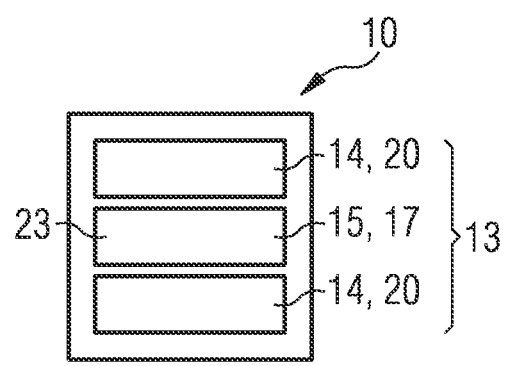

The pixel cell 10 shown in FIGS. 4A and 4B is operated as follows. The pixels 11 are exposed to electromagnetic radiation which is converted into electrical signals by the photodiodes 12. The electrical signals of the pixels 11 of the first group of pixels 11 are transferred to the first readout component 14. The first readout component 14 can be operated in rolling shutter mode or in global shutter mode. The electrical signals of the pixels 11 of the second group of pixels 11 are transferred to the second readout component 15 during the illumination with electromagnetic radiation. Transferring the electrical signals of the pixels 11 of the second group of pixels 11 to the second readout component 15 comprises either transferring the electrical signals of each pixel 11 of the second group of pixels 11 to a respective storage capacitor 16 of the second readout component 15, or transferring the electrical signals of each pixel 11 of the second group of pixels 11 to a memory element 17 of the second readout component 15. The second alternative is shown in FIGS. 5A and 5B. The first readout component 14 and the second readout component 15 and can be operated independently from each other.

Figure 4C:
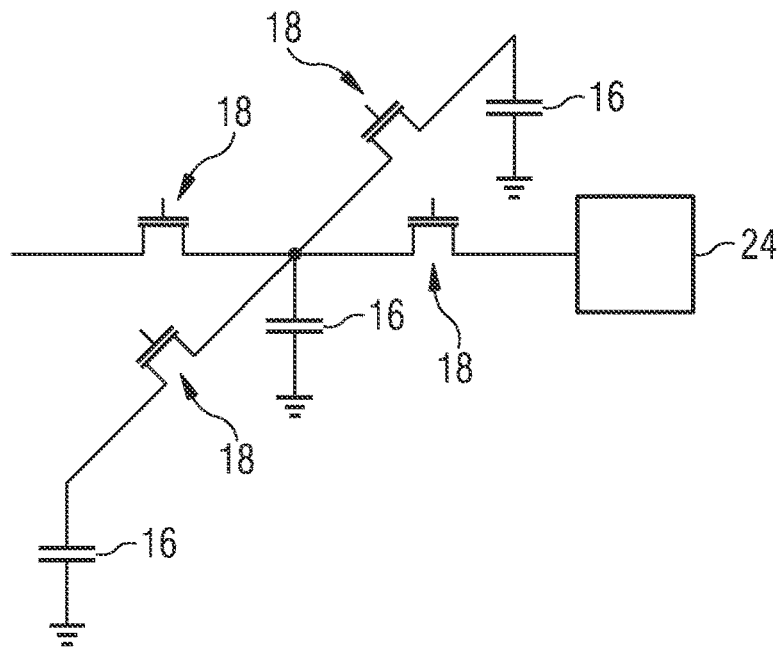
FIG. 4C shows a section of a readout circuit of an exemplary embodiment of the pixel cell.

In FIG. 4C a section of the readout circuit 13 of an exemplary embodiment of the pixel cell 10 is shown. The section shows a part of the second readout component 15 of readout circuit 13. Three of the storage capacitors 16 are shown in FIG. 4C. The storage capacitors 16 are connected with each other in parallel. Between each two of the storage capacitors 16 a switch 18 is arranged, respectively. Furthermore, the storage capacitors 16 are connected with the pixels 11 via another switch 18. In addition, the storage capacitors 16 are connected with an output 24 of the pixel cell 10 via another switch 18.

In FIG. 5A a top view of another exemplary embodiment of the pixel cell 10 is shown. In the top view, the setup of the embodiment shown in FIG. 5A is the same as the setup shown in FIG. 4A.

In FIG. 5B a view on a layer of the exemplary embodiment of the pixel cell 10 shown in FIG. 5A that is arranged below the plurality of pixels 11 is shown. The only difference to the embodiment shown in FIG. 4B is that the second readout component 15 comprises a memory element 17 instead of the storage capacitors 16. The memory element 17 can be a static random access memory. The second readout component 15 further comprises an analog-to-digital converter 23, wherein an input of the analog-to-digital converter 23 is configured to be connected with at least one pixel 11 of the second group of the pixels 11 and an output of the analog-to-digital converter 23 is configured to be connected with the memory element 17. For the transfer of the electrical signals of the pixels 11 of the second group of pixels 11 to the memory element 17 the electrical signals are each converted into a digital signal by the analog-to-digital converter 23 before being transferred to the memory element 17.

Figure 6:
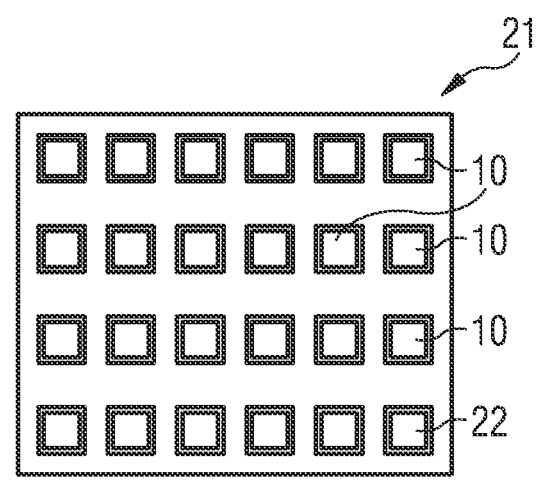
FIG. 6 shows an exemplary embodiment of an image sensor.

In FIG. 6 a top view on an exemplary embodiment of an image sensor 21 is shown. The image sensor 21 comprises a plurality of pixel cells 10. The pixel cells 10 are arranged as a two-dimensional array. The image sensor 21 further comprises a light source 22 that is synchronized with the pixel cells 10.

The invention claimed is:
1. A pixel cell comprising:
a plurality of pixels, each pixel comprising a photodiode,
a readout circuit comprising a first readout component and a second readout component, wherein
a first group of the pixels is configured to detect electromagnetic radiation in a first wavelength range,
a second group of the pixels is configured to detect electromagnetic radiation in a second wavelength range,
the first readout component is connected with the first group of pixels, the second readout component is connected with the second group of pixels, the first wavelength range is different from the second wavelength range, the pixel cell is configured to transfer electrical signals of the pixels of the second group of pixels to the second readout component during illumination with electromagnetic radiation, and the second readout component comprises a plurality of storage capacitors, wherein each pixel of the second group of pixels is assigned to at least one of the storage capacitors, or the second readout component comprises a memory element, and the first readout component and/or the second readout component are configured to be operated in a rolling shutter mode.

2. The pixel cell according to claim 1, wherein each of the storage capacitors is connected with an input of an analog-to-digital converter.

3. The pixel cell according to claim 1, wherein the second readout component comprises an analog-to-digital converter, wherein an input of the analog-to-digital converter is configured to be connected with at least one pixel of the second group of the pixels and an output of the analog-to-digital converter is configured to be connected with the memory element.

4. The pixel cell according to claim 1, wherein the first group of the pixels is configured to detect electromagnetic radiation in the visible range.

5. The pixel cell according to claim 1, wherein the second group of the pixels is configured to detect electromagnetic radiation in the infrared range.

6. The pixel cell according to claim 1, wherein the readout circuit is arranged at a side of the plurality of pixels that faces away from a radiation entrance side of the pixel cell.

7. The pixel cell according to claim 1, wherein the readout circuit and the plurality of pixels are stacked on top of each other.

8. The pixel cell according to claim 1, wherein the first readout component comprises at least two portions that are arranged spaced apart from each other.

9. The pixel cell according to claim 8, wherein the second readout component is arranged between the two portions of the first readout component in a lateral direction that extends parallel to a main plane of extension of the pixel cell.

10. An image sensor comprising a plurality of pixel cells according to claim 1, and a light source that is synchronized with the pixel cells.

11. A method for operating a pixel cell, the method comprising:

exposing a plurality of pixels of a pixel cell to electromagnetic radiation, wherein each pixel comprises a photodiode, wherein a first group of the pixels is configured to detect electromagnetic radiation in a first wavelength range, and wherein a second group of the pixels is configured to detect electromagnetic radiation in a second wavelength range, converting electromagnetic radiation into electrical signals by the photodiodes, transferring the electrical signals of the pixels of the first group of pixels to a first readout component of a readout circuit of the pixel cell, transferring the electrical signals of the pixels of the second group of pixels to a second readout component of the readout circuit, during the illumination with electromagnetic radiation wherein the first wavelength range is different from the second wavelength range, and transferring the electrical signals of the pixels of the second group of pixels to the second readout component comprises either transferring the electrical signals of each pixel of the second group of pixels to a respective storage capacitor of the second readout component, or transferring the electrical signals of each pixel of the second group of pixels (11) to a memory element of the second readout component, and the first readout component and/or the second readout component are configured to be operated in a rolling shutter mode.

12. The method according to claim 11, wherein the electrical signals of the pixels of the second group of pixels are transferred to the second readout component sequentially or in groups.

13. The method according to claim 11, wherein the first readout component and the second readout component are operated independently from each other.

14. The method according to claim 11, wherein the electrical signals stored by the storage capacitors are converted into digital signals by an analog-to-digital converter.

15. The method according to claim 11, wherein the electrical signals of each pixel of the second group of pixels are converted into digital signals by an analog-to-digital converter before being transferred to the memory element.

* * * * *